United States Patent Office 3,395,074
Patented July 30, 1968

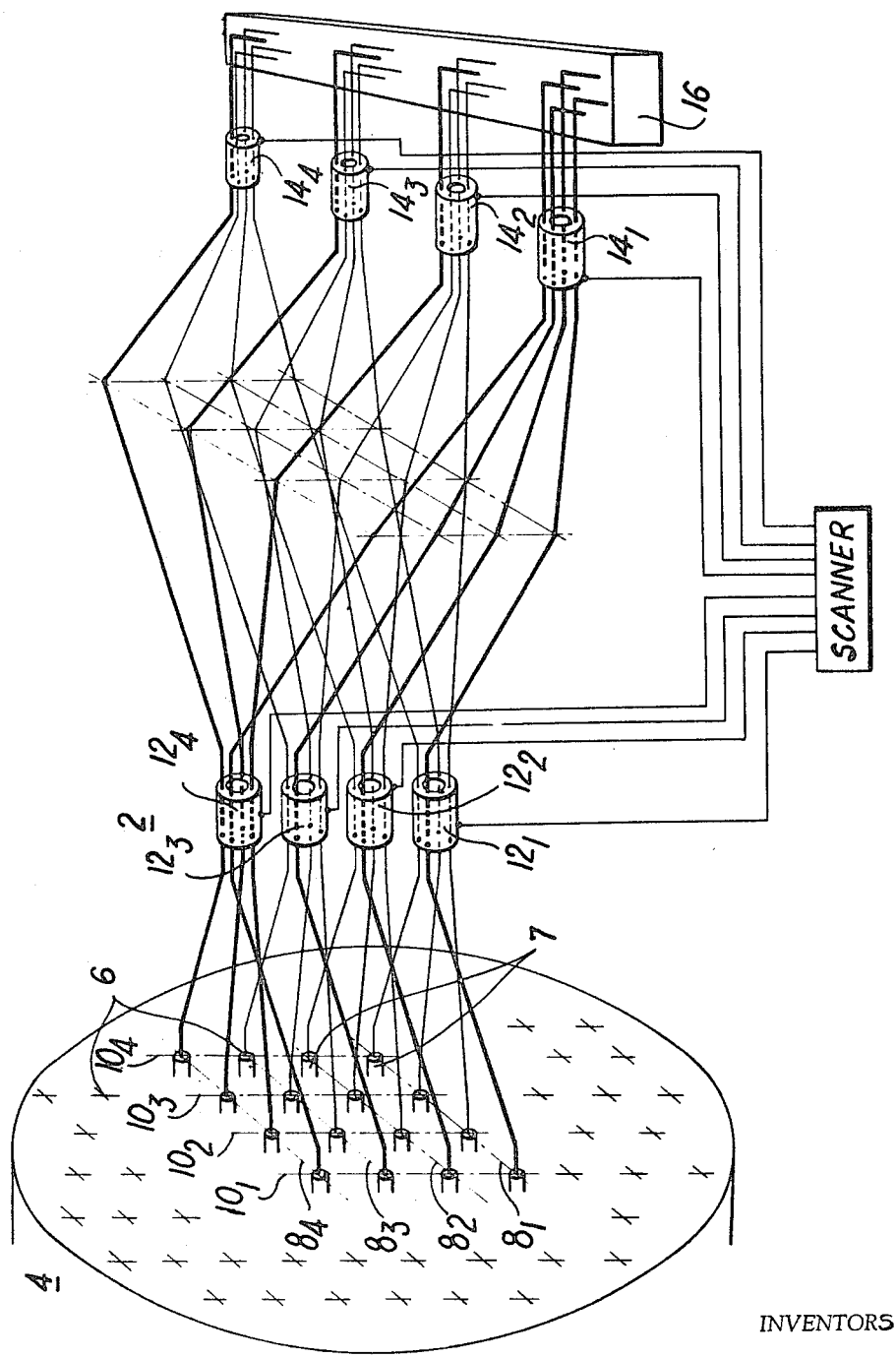

3,395,074
APPARATUS FOR DETECTING FUEL ELEMENT
CAN FAILURES
Paul Douet, Savigny-sur-Orge, and André Roguin, Antony, France, assignors to Commissariat à l'Energie Atomique, Paris, France
Filed Feb. 28, 1966, Ser. No. 530,459
Claims priority, application France, Mar. 12, 1965, 9,086
3 Claims. (Cl. 176—19)

ABSTRACT OF THE DISCLOSURE

Method and apparatus capable of detecting fuel element can failures in nuclear reactors which are cooled by circulation of fluid within the channels occupied by the fuel elements. A fluid sample is derived from each channel of the reactor via a separate sampling conduit. The plurality of sampling conduits is arranged into a matrix whereby each conduit is a member of at least a line and a column. A number of detector units are used to monitor variations in the radiation level of the group of conduits included in each line and separately the group of conduits included in each column. It is then possible, by comparing the conduit membership of each group which exhibits a variation in radiation level, to individually identify each abnormal fluid sample. Sampling conduits may be arranged into a two or three dimensional matrix which includes lines, columns, rows, and/or random patterns of conduits. Since an abnormal fluid sample will be detected in each group of which it is a member, conduit groupings based upon such more complex patterns may be used to provide a monitoring arrangement of increased reliability whenever necessary.

---

This invention relates to a device for measuring and localizing the variation of a characteristic of a fluid flowing through a series of similar pipes. There is circulated within each pipe a fluid which is derived from one of the chemical production units which forms part of a series of identical units, or a fluid which flows through a group of heat transfer systems, or more particularly the coolant fluid of a nuclear reactor. In the case last mentioned, the invention is concerned with the monitoring of the different fuel channels of a reactor with a view to detecting a fuel element can failure.

Known devices of this type such as those described in U.S. Patents Nos. 3,146,171 and 3,161,569 make use of matrix systems for sampling fluid in the coolant channels of a nuclear reactor, that is to say systems in which at least two samples are taken from each channel, one sample being directed towards a line manifold and the other towards a column manifold, each manifold being coupled with a detector.

These devices make use of fission product detectors (of the electrostatic precipitation type, for example) through which are circulated fluids derived from the different channels of a same line or a same column and mixed within the corresponding manifold. The information relating to the individual activity of the fluid which is transported within each channel is consequently lost. The need for taking two measurements of activity per channel, namely one measurement in the case of the line to which said channel belongs and another measurement in the case of the column makes it necessary on account of the mixing to take two samples per channel, thereby entailing the use of complex circuits for the distribution of fluids sampled between the different detectors and makes it necessary to take special precautions in order to retain identical sensitivities in the different channels.

Finally, the admission of fluids from different reactor channels into a single manifold is liable to give rise to stray circulation currents within the manifold if the inlet pressures are not strictly equal.

Burst can detection systems have also been devised whereby the samples taken from $m$ channels are grouped round a so-called group detector and the total activity of the fluid which is derived from the $m$ channels is measured. But in order to identify the faulty channel when a defect is found by said group detector, each sample must be analyzed in turn by a suitable follow-up detector or so-called "burst follower," by means of switching or changeover devices such as electrovalves. An apparatus of this type forms the subject of U.S. patent application Ser. No. 428,802, as filed on Jan. 28, 1965, in respect of "Device for Measuring the Concentration of Fission Products in Suspension in a Fluid."

The device for detecting the variation of a characteristic of each fluid which flows through a series of similar pipes in accordance with the present invention is not subject to the drawbacks referred to above.

The sampling pipes in which fluids are circulated for the purpose of monitoring a characteristic of said fluid by means of a device in accordance with the invention are spaced in a matrix arrangement having $n$ dimensions ($n=3$) such that, for example, each channel has the order $i$ in a first assembly or line assembly, the order $j$ in a second assembly or column assembly and . . . the order $k$ in an $n$th assembly of row assembly. The device is characterized in that each pipe passes on the one hand together with all of the pipes of the order $i$ in the first assembly (pipe of line $i$) through a detection unit designated as first-assembly or line detector for detecting the variation in a characteristic of the fluid, then together with all of the pipes of the order $j$ in the second assembly (pipes of column $j$) through a detection unit designated as a second-assembly $k$ or column detector for detecting said variation of the same characteristic of the fluid and, finally, together with all of the pipes of the order $k$ in the third assembly (pipes of row $k$) through a detection unit designated as third-assembly or row detector for detecting said variation of the same characteristic of the fluid, each pipe remaining separate with each detection unit.

When the pipes are disposed in a two-dimensional matrix arrangement, each pipe forms part of a line and of a column and passes through two monitoring units referred to as line and column monitors.

In the case in which the invention is applied to burst can detection in a nuclear reactor, the line and column detectors preferably have the same structural arrangement as those described in patent application No. 428,802 which has already been cited.

In a device of this type according to the invention, by virtue of the fact that each sample is maintained separate in the detectors, the location of a faulty channel is effected by means of a single sampling of fluid per channel, the information contained in the fluid being read at least twice, once in order to determine the line, for example, and a second time in order to determine the column.

Aside from the main arrangements which have just been set forth, a number of different secondary arrangements will now to described by reference in particular to one mode of application of the method according to the invention.

In order that the technical characteristics of this invention may be more readily understood, consideration will accordingly be given to one example of construction which concerns a rectangular matrix arrangement having two dimensions as illustrated in the single figure of the accompanying drawings, it being understood that said figure is not given in any sense by way of limitation in regard to either the modes of practical application or potential uses thereof.

The figure represents a detection unit 2 for detecting fuel element can failures in a nuclear reactor 4 which is cooled by circulation of fluid within channels occupied by fuel elements. There are shown the outlets 6 of the fuel element coolant ducts which are joined to the reactor channel outlets. A certain number of said outlets 6 have extensions in the form of cooling fluid sampling pipes 7 which are disposed in lines $8_1, 8_2 \ldots 8_4$ and columns $10_1, 10_2 \ldots 10_4$.

Each sampling pipe which forms part of the same line passes through a same detection unit $12_1 \ldots 12_4$; said detectors can be, for example, of the same type as those employed in the above-cited patent application. In any case, said detectors must have characteristics such that the reading of the data supplied by the activity of the fluid which flows through a sampling pipe is not erased by the measurement which is taken in the detection unit. It will be recalled that a detection unit as described in the above-mentioned patent application is based on the principle of detection of delayed neutrons emitted by the fluid under analysis and is characterized in that a plurality of pipe sections through which are circulated samples of fluid derived from different sources are placed around a neutron detector (not shown), the respective arrangement, dimensions and fluid supply of said pipe sections being so determined that the response of said detector to a given concentration of fission products in any one of the pipes is substantially the same irrespective of the pipe considered.

At the outlet of the line detection units, the sampling pipes are re-grouped in the columns which they form at the exit of the reactor. Each sampling pipe which forms part of a column again passes through a column detection unit ($14_1$ to $14_4$). It is apparent that these detectors can be of the type which has already been mentioned.

The pipes which pass out of said second series of detection units are joined, for example, to a manifold 16 which permits the return of the fluid to the reactor inlet. Alternatively, should it be found desirable for any reason not to mix the different fluid sampling lines, said pipes can remain separate.

A conventional scanning system may be used to automatically process the outputs of the line detection units. Thus, the scanning unit shown in the drawing receives and stores a separate input from each of the line detection units $12_1$–$12_4$ and also from each of the column detection units $14_1$–$14_4$. Upon receiving an abnormal signal from one of the line detector units, for example $12_4$, and from one of the column detector units, for example $14_1$, the scanning device automatically selects the unique sample conduit ($8_4, 10_1$) which passes through each of these detectors. This in turn locates the coolant channel in which a fuel element can failure has occurred which information may be displayed on any suitable type of display unit.

It should be noted that, in the case of the burst can detector shown in the figure, the coolant ducts are extended by pipes arranged in a square matrix consisting of four lines and four columns. Although it remains feasible to utilize a rectangular matrix arrangement, the square matrix arrangement shown in the figure is nevertheless preferred inasmuch as identical detectors can be employed for the units 12 and 14.

The arrangement herein described can be adapted to the case of a sampling pipe arrangement along concentric circumferences and radii or in a three-dimensional matrix, three series of collecting detectors must in that case be employed.

This type of burst can detection apparatus permits of rapid identification of a faulty channel inasmuch as the time required for this identification is the time of transit of the sampled fluid between a line detector ($12_n$) and a column detector ($14_m$).

It should be noted that, in the case in which the measuring and localizing device which forms the subject of this invention serves to monitor identical production units, the storage of any abnormal product detected in one of the pipes can be initiated by the controlled operation of electrovalves. In this case, the measured characteristic can be a dielectric constant, a resistivity, a magnetic property, a transparency and so forth.

What we claim is:

1. Apparatus for detecting fuel element can failures in a nuclear reactor cooled by circulation of fluid through a plurality of channels adjacent to said fuel element cans, including:
   a plurality of sample conduits arranged in a configuration of lines of conduits and columns of conduits with each one of said conduits being included in one line and also included in one column;
   means for transmitting a single sample of coolant fluid from each reactor channel to a separate one of said plurality of sample conduits;
   a first plurality of radiation detectors for said lines of conduits, each detector being associated with the conduits of a corresponding line in order to monitor any variation in the radiation level of the coolant carried therein;
   a second plurality of radiation detectors for said columns of conduits, each detector being associated with the conduits of a corresponding column in order to monitor any variation in the radiation level of the coolant carried therein; and
   means for scanning the outputs of said radiation detectors to display any abnormal variations in the monitored radiation values whereby a ruptured fuel element can may be located by identifying the line of conduits and the column of conduits in which abnormal radiation levels occur.

2. Apparatus as described in claim 1 wherein each of said first radiation detectors is comprised of a section of each of the conduits included in a corresponding line, said conduit sections being symmetrically disposed around a detector cell; and
   each of said second radiation detectors is comprised of a section of each of the conduits included in a corresponding column, said conduit sections being symmetrically disposed around a detector cell.

3. Apparatus for detecting fuel element can failures in a nuclear reactor cooled by circulation of fluid through a plurality of channels adjacent to said fuel element cans, including:
   a plurality of sample conduits arranged into a first plurality of groups and a second plurality of assemblies, with each of said sample conduits being included in one of said groups and also included in one of said assemblies;
   means for transmitting a single sample of coolant fluid from each reactor channel to a separate one of said plurality of sample conduits;
   a first plurality of radiation detectors for said groups of conduits, each of said detectors being associated with the conduits of a corresponding group in order to monitor any variation in the radiation level of the coolant carried therein;
   a second plurality of radiation detectors for said assemblies of conduits, each of said detectors being associated with the conduits of a corresponding assembly in order to monitor any variation in the radiation level of the coolant carried therein; and
   means for scanning the outputs of said radiation detectors to display any abnormal variations in the monitored radiation values whereby a ruptured fuel element can may be located by identifying the group of conduits and the assembly of conduits in which abnormal radiation levels occur.

(References on following page)

References Cited

UNITED STATES PATENTS

| | | | |
|---|---|---|---|
| 3,088,899 | 5/1963 | Gibbons | 176—19 |
| 3,092,819 | 6/1963 | Cochinal | 176—19 |
| 3,109,929 | 11/1963 | Picard | 176—19 X |
| 3,116,210 | 12/1963 | Cochinal et al. | 176—19 |
| 3,161,569 | 12/1964 | Donguy et al. | 176—19 |
| 3,200,041 | 8/1965 | Ralfe et al. | 176—19 |

FOREIGN PATENTS 929,838  6/1963  Great Britain.

REUBEN EPSTEIN, *Primary Examiner.*